(12) United States Patent
Wei

(10) Patent No.: US 10,496,710 B2
(45) Date of Patent: Dec. 3, 2019

(54) ONLINE DATA MANAGEMENT SYSTEM

(71) Applicant: Jerome H. Wei, La Habra, CA (US)

(72) Inventor: Jerome H. Wei, La Habra, CA (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 765 days.

(21) Appl. No.: 14/699,701

(22) Filed: Apr. 29, 2015

(65) Prior Publication Data
US 2017/0300572 A1    Oct. 19, 2017

(51) Int. Cl.
| | |
|---|---|
| *G06F 16/951* | (2019.01) |
| *G06F 16/245* | (2019.01) |
| *G06F 16/28* | (2019.01) |
| *G06F 16/901* | (2019.01) |
| *G06F 8/30* | (2018.01) |

(52) U.S. Cl.
CPC ............ *G06F 16/951* (2019.01); *G06F 8/315* (2013.01); *G06F 8/37* (2013.01); *G06F 16/245* (2019.01); *G06F 16/284* (2019.01); *G06F 16/289* (2019.01); *G06F 16/9024* (2019.01)

(58) Field of Classification Search
None
See application file for complete search history.

(56) References Cited

U.S. PATENT DOCUMENTS

| | | | | |
|---|---|---|---|---|
| 6,851,107 B1 * | 2/2005 | Coad | ......................... | G06F 8/20 717/108 |
| 7,506,053 B1 * | 3/2009 | Qin | ........................... | G06F 8/60 709/225 |
| 8,819,617 B1 * | 8/2014 | Koenig | ..................... | G06F 8/70 717/101 |
| 9,171,039 B2 * | 10/2015 | Teichmann | ....... | G06F 16/24534 |
| 2002/0010909 A1 * | 1/2002 | Charisius | .................. | G06F 8/20 717/106 |
| 2006/0159077 A1 | 7/2006 | Vanecek, Jr. | | |
| 2006/0168331 A1 | 7/2006 | Thompson et al. | | |
| 2007/0112574 A1 | 5/2007 | Greene | | |
| 2008/0134156 A1 * | 6/2008 | Osminer | ............. | G06F 9/44589 717/140 |
| 2009/0234903 A1 | 9/2009 | Lomelli et al. | | |

(Continued)

FOREIGN PATENT DOCUMENTS

WO    2012054022 A1    4/2012

OTHER PUBLICATIONS

International Search Report from corresponding PCT/US215/028447, dated Jun. 21, 2016.

(Continued)

*Primary Examiner* — Usmaan Saeed
*Assistant Examiner* — Katriel Y Chiu
(74) *Attorney, Agent, or Firm* — Tarolli, Sundheim, Covell & Tummino LLP

(57) ABSTRACT

An online data management (ODM) system can be configured to parse tool data for a particular project provided from a plurality of disparate software tools employed for project management. The ODM system can also be configured to generate a data structure based on the tool data, wherein the data structure comprises a hierarchy of interconnected objects. The ODM system can further be configured to identify relationships between objects of the data structure.

16 Claims, 8 Drawing Sheets

(56) References Cited

U.S. PATENT DOCUMENTS

| | | | |
|---|---|---|---|
| 2009/0319993 A1* | 12/2009 | Denver | G06F 8/24 |
| | | | 717/121 |
| 2012/0259909 A1 | 10/2012 | Bachelor et al. | |
| 2012/0271837 A1 | 10/2012 | Kryger et al. | |
| 2014/0143750 A1* | 5/2014 | Gangadharan | G06F 8/10 |
| | | | 717/102 |
| 2014/0201418 A1 | 7/2014 | Turner et al. | |
| 2014/0229223 A1* | 8/2014 | Shakil | G06Q 10/06313 |
| | | | 705/7.23 |
| 2014/0282356 A1 | 9/2014 | Mills et al. | |
| 2015/0066163 A1 | 3/2015 | Meenakshi | |
| 2015/0074279 A1 | 3/2015 | Maes et al. | |
| 2015/0082281 A1* | 3/2015 | Koenig | G06F 11/3668 |
| | | | 717/124 |

OTHER PUBLICATIONS

Adkins: *"Managing Software Projects Like a Boss with Subversion and Trac"*; Light Point Security, LLC; http://lightpointsecurity.com/downloads/bosworkshop.pdf ; Copyright 2011; pp. 1-32.
Core®8; http://www.vitechcorp.com/support/documentation.shtml; pp. 1-58.

* cited by examiner

ONLINE DATA MANAGEMENT SYSTEM

GOVERNMENT INTEREST

The invention was made under Air Force Research Laboratories Contract Number FA8650-11-C-3104. Therefore, the U.S. Government has rights to the invention as specified in that contract.

TECHNICAL FIELD

This disclosure relates to an online data management system that parses tool data.

BACKGROUND

Project management is the process and activity of planning, organizing, motivating, and controlling resources, procedures and protocols to achieve specific goals in scientific or daily problems. A project is a temporary endeavor designed to produce a unique product, service or result with a defined beginning and end (usually time-constrained, and often constrained by funding or deliverables) undertaken to meet unique goals and objectives, typically to bring about beneficial change or added value. The temporary nature of projects stands in contrast with operations, which are repetitive, permanent or semi-permanent functional activities to produce products or services.

Common modeling infrastructure can refer to software libraries that can be shared across multiple institutions in order to increase software reuse and interoperability in complex modeling systems. Early initiatives were in the climate and weather domain, where software components representing distinct physical domains (for example, ocean or atmosphere) tended to be developed by domain specialists, often at different organizations. In order to create complete applications, these needed to be combined together, using for instance a general circulation model that transfers data between different components.

SUMMARY

One example relates to a non-transitory machine readable medium having machine executable instructions comprising an online data management (ODM) system configured to parse tool data for a particular project provided from a plurality of disparate software tools employed for project management. The ODM system can also be configured to generate a data structure based on the tool data, wherein the data structure comprises a hierarchy of interconnected objects. The ODM system can further be configured to identify relationships between objects of the data structure.

Another example relates to one or more computing devices that execute an ODM system. The ODM system can include an association engine configured to parse tool data received from a plurality of different software tools that are employed to implement a particular project, wherein each of the different software tools generates data in a different format. The association engine can also be configured to index the tool data to form a data structure with interconnected objects arranged in a hierarchical graph. The ODM system can further include a converter configured to generate web data that characterizes the data structure, wherein the web data includes a plurality of links to access the different software tools.

Yet another example relates to a method that can include receiving tool data from a plurality of different software tools employed in a project. The method can also include indexing the tool data to form a data structure having a plurality of objects hierarchically interconnected. The method can further include determining relationships between the objects of the data structure based on at least one of keywords and user input.

DETAILED DESCRIPTION

An Online Data Management (ODM) system is described herein for integrating data from a plurality of disparate (software) tools for project management. The ODM system can parse tool data received from the plurality of different (software) tools. The ODM system can associate information (e.g., the tool data) from the different tools to form a unified data structure. The data structure can be represented as a hierarchical graph of interconnected objects. The ODM system can also be configured to identify relationships between individual objects of the data structure. The data structure (including the objects) can be stored in a relational database, such as a Search and Query Language (SQL) database. In this manner, database applications (e.g., searching, analytics, reporting, etc.) can be performed on the data structure.

Additionally, the ODM system can generate web data based on the data structure. The web data can be output (e.g., by a web server) as web pages. The web pages can be configured to allow users to expand different portions of the data structure and/or access specific objects in the data structure via a corresponding one of the plurality of tools. By employment of the web data generated by the ODM system, users can navigate a project that is being implemented with a number of different tools concurrently.

Figure 1:
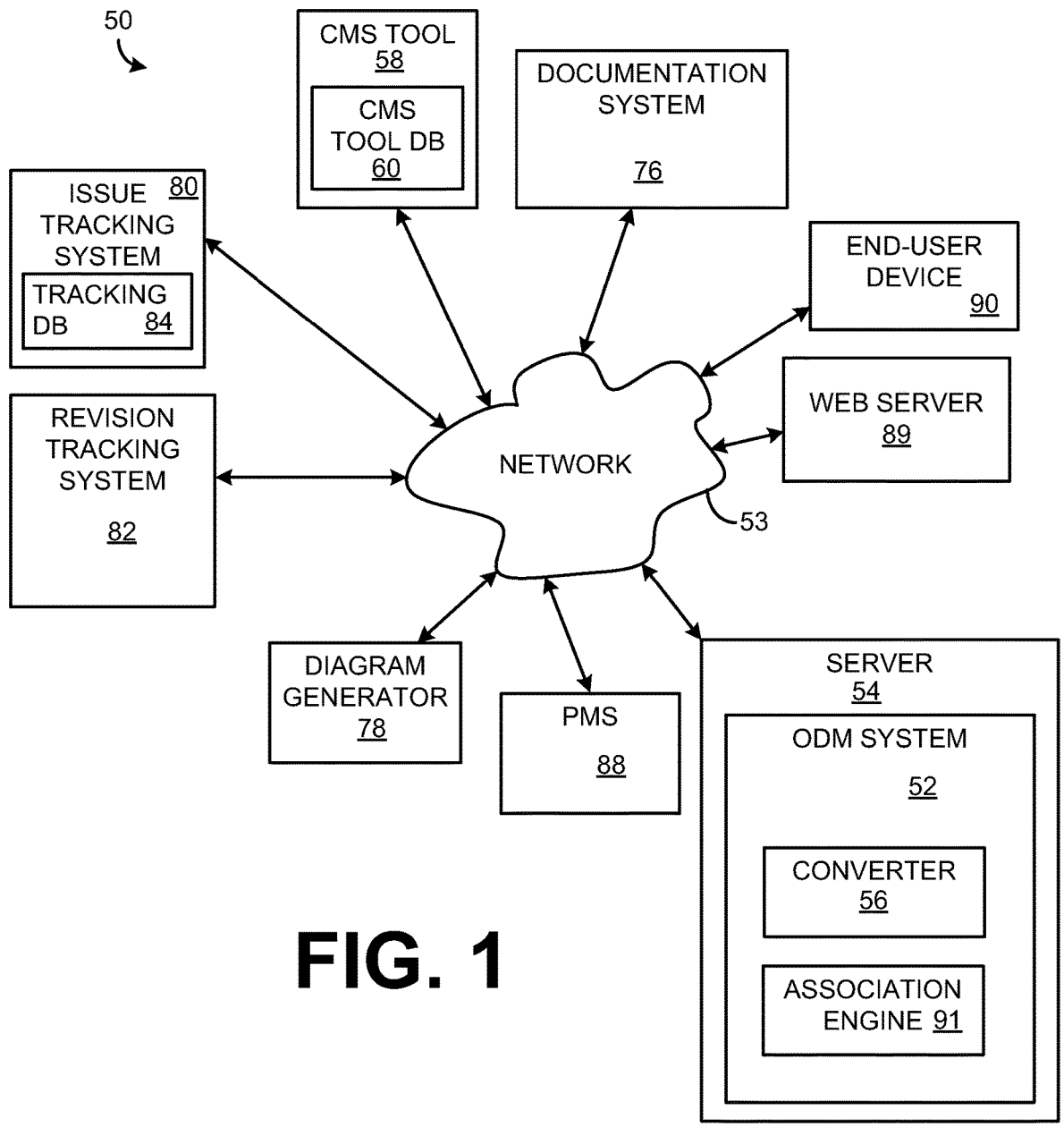
FIG. 1 illustrates an example of a system to implement an Online Data Management (ODM) system to integrate data from a plurality of disparate tools.

FIG. 1 illustrates an example of a system 50 that could be employed to implement an ODM system 52 that executes on a server 54. As described herein, the ODM system 52 can integrate data provided from a plurality of disparate (software) tools. The server 54 could be a cloud computing device (e.g., one or more computing devices operating on a network) or a stand-alone server. The server 54 can also include a non-transitory machine readable medium, such as memory (volatile and/or non-volatile) that is accessible by a processor. The memory can be employed to store the machine readable instructions. The ODM system 52 can communicate with nodes on a network 53. The network 53 can be implemented, for example, as a public network (e.g., the Internet), a private network (e.g., a local area network (LAN)) or a combination thereof (e.g., a virtual private network (VPN)). The ODM system 52 can be employed to associate information from various disparate tools employed in project management in a unified data structure. The unified data structure can be converted by a converter 56 of the ODM system 52 in to a format that can be rendered on a display for manipulation and analysis by an end-user. The converter 56 could be implemented, for example, as a Hypertext Markup Language (HTML) converter. In some examples, the converter 56 can be implemented on an external system.

The system 50 can include a complex modeling system (CMS) tool 58 for building complex system models that utilize data from external input data sources. For example, the CMS tool 58 can be configured to design the complex system models that retrieve and utilize data characterizing complex system models, such as computed analysis information, Computer Aided Design (CAD) mechanical and electrical diagrams, user inputted information, test data from sensors, hardware specifications, etc. The CMS tool 58 could be implemented, for example, as the CORE tool 9® or other CMS system. The CMS tool 58 can be executed on a server and/or a computing cloud. The CMS tool 58 can generate CMS tool data as a single an expansive document that is associated with a particular project that characterizes the complex system models of the particular project. The CMS tool data can be stored in a CMS tool database (DB) 60 or other data structure. The CMS tool data can be retrieved (or received) by the ODM system 52 via the network 53. In some examples, the CMS tool 58 can include an application programming interface (API) that can facilitate the retrieval of the CMS tool data.

The ODM system 52 can also retrieve (or receive) software reference documentation data generated by a documentation system 76 via the network 53. The documentation system 78 can be configured to retrieve documentation of user generated source code (e.g., from an associated software development project). The documentation system 76 can be implemented, for example, as DOXYGEN®. In some examples, the documentation system can store (general) document data that characterizes general information related to a project, such as a user's guide and/or whitepapers.

The system 50 can also include a diagram generator 78 that can generate flow charts (e.g., in the form of graphical data) characterizing a designed multi-domain dynamic system flow model constructed in data flow software. The diagram generator 78 could be implemented, for example, as SIMULINK®. The diagram generator 78 is configured to generate diagram-flow data based on the received flow graphical data and supply the diagram-flow data. The ODM system 52 can retrieve (or receive) the diagram flow-data.

The system 50 can further include an issue tracking system 80 and a revision tracking system 82. The issue tracking system 80 can be configured to keep track of reported software bugs in the associated software development projects and the revision tracking system 82 can be configured to track changes (software version changes) in the associated software development projects. The issue tracking system 80 can be configured to retrieve reports of software bugs in the associated software development projects from the issue tracking database and retrieve track changing data from the revision control system and generate issue-bug-tracking data. The issue tracking system 80 can store the issue-bug-tracking data characterizing the reported software bugs in a tracking database 84. The revision tracking system 82 can further be configured to interact with the documentation system 76 to integrate revision control system information into the documentation system 76. Issue-bug-tracking data from the issue tracking system 80 and revision data from the revision tracking system 82 can be retrieved (or received) by the ODM system 52.

The system 50 can yet further include a project management system (PMS) 88. The PMS 88 can be configured to create budgets based on assignment work and resource rates. The PMS 88 can be configured to calculate project data as resources are assigned to tasks and assignment work estimated. The project data can include, but is not limited to the cost (equal to the work times the rate) for each task as well as a summary tasks and a cost of an overall project. Resource definitions (people, equipment and materials) can be shared between projects using a shared resource pool. Each resource can have its own calendar, which defines what days and shifts a resource is available. Additionally, the PMS 88 can calculate percentage of completion of each task and a total percentage completion of the project. The PMS 88 can be implemented, for example, as MICROSOFT PROJECT®. The parentage of completion of each task and the overall percentage completion of the project can be included in the project data. The project data can be retrieved (or received) by the ODM system 52. It is noted that in other examples, more or less databases than the tracking database 84 and the CMS tool database 60 could be implemented.

The ODM system 52 can be configured to analyze the issue-bug-tracking data, the revision data, the diagram-flow data, the CMS tool data, software reference documentation data, the document data and the project data, which can be collectively referred to as "tool data", to form a unified data structure. The unified data structure can be formed of a plurality of objects that are hierarchically arranged. Moreover, the ODM system 52 can aggregate the data retrieved (or received) to identify relations between objects in each tool of the system. The data structure can be stored in a relational database, such as a Search and Query Language (SQL) database. In this manner database operations, such as searching analytical analysis, report generation, permission control, etc. can be executed on the data structure.

Additionally, the ODM system 52 can include a converter 56 that can generate web data (e.g., a web page representation of the data structure) based on the tool data. To facilitate better understanding of the operation of the ODM system 52, a first extended example, (hereinafter, "the first example") is explained.

In the first example, it is presumed that the system 50 is employed to manage development of an autonomous robot (a particular project). In the first example, the CMS tool 58 can include flow charts, CAD drawings and operational specifications for the autonomous robot. In particular, in the first example, the CMS tool 58 can include a flow chart explaining self-calibration of a particular camera employed by the robot. Further, the documentation data provided from the documentation system 76 can include documentation of operational source code of the autonomous robot that includes documentation related to the source code of the self-calibration function of the camera. Moreover, in the first example, the issue tracking system 80 can store issue-bug-tracking data that characterize bugs in the source code of the autonomous robot, including a bug in the source code of the self-calibration of the camera. In the first example, the PMS 88 can include a project for the autonomous robot, and a task of the project that includes completing self-calibration of a camera.

In the first example, the ODM system 52 can include an association engine 91 to parse the tool data and index the tool data to form a unified data structure that characterizes a hierarchical graph of objects for the project of the autonomous robot. In the first example, the ODM system 52 can determine relationships between objects in the unified data structure. For instance, the association engine of the ODM system 52 can identify relationships between objects in each of the tools of the system 50. Specifically, in the first example, the ODM system 52 can assign a relationship between the flow-chart for the self-calibration of the camera, the documentation of the source code of the self-calibration of the camera, the identified bug for the source code of the self-calibration operation of the camera and the task of the project for completing the self-calibration of the camera that are each included in different portions of the tool data (wherein the different portions can be provided from the different tools).

The ODM system 52 can employ the converter 56 to generate links (e.g., HTML hyperlinks) for objects that share a relationship. Additionally, the ODM system 52 can employ analytics to analyze (e.g., using keywords and/or user input) each of the objects in the unified data structure to determine if updates to objects in the unified data structure (based on the tool data) can be made. In the first example, the ODM system 52 can analyze the various objects in the unified data structure related to self-calibration of the camera. Moreover, based on the analysis, the ODM system 52 can alter the project data to reflect a new percentage of completion of the task of completing self-calibration of the camera. Similarly, the ODM system 52 can alter the project data to reflect a new percentage of completion of the project of the autonomous robot. Additionally, the ODM system 52 can return the updated project data to the PMS 88.

The ODM system 52 can employ the converter 56 to generate web data (e.g., HTML code including hyperlinks) that can be delivered to a Web Server 89 that can be accessed by an end-user device (e.g., a computing device) 90. The end-user device 90 can output (e.g., display) web pages to facilitate analysis and/or modification of objects in the unified data structure. In first example, the web page could provide a user a link for opening a web page for the project of the autonomous robot. Upon selecting such a link, another web page with a list of links for individual portions of the project can be output. In the first example, one such portion of the project could be self-calibration of the camera. Upon selecting the link, yet another web page with links to specific data objects in the unified data structure. In the first example, such links could be links to specific objects in the unified data structure related to self-calibration of the camera.

For instance, a first link can be implemented as a link to the flow-chart for the self-calibration of the camera in the CMS tool 58. In such a situation, selection of the first link can initiate opening of a particular file corresponding to the flow-chart for the self-calibration of the camera in the CMS tool 58. Additionally, in the first example, a second link can be implemented as a link to the documentation of the source code of the self-calibration of the camera. Thus, selection of the second link can cause the documentation system 76 to open the source code for the self-calibration of the camera. Similarly, in the first example, a third link can be implemented as a link to the identified bug for the source code of the self-calibration operation of the camera. In this situation, selection of the third link can cause the issue tracking system 80 to open a file corresponding to the identification of the bug in the source code. Further still, in the first example, a fourth link can be implemented as a link to the task of the project for completing the self-calibration of the camera. In this situation, selection of the fourth link can cause the PMS 88 to open a file associated with the task for completing the self-calibration of the camera.

By employing the ODM system 52, data from disparate tools (the tool data) for project management, such as, but not limited to the CMS tool 58, the documentation system 76, the issue tracking system 80, the revision tracking system 82 and/or the PMS 88 employed to complete a project can be linked together to facilitate tool integration. Such a linking allows an end-user to traverse the ever increasing complexity of project management. Additionally, by including hyperlinks to objects in the disparate tools, the actual workflow of each tool remains substantially unaltered. In this manner, the end-user can traverse a complex project (e.g., via the links) while the end-user is still provided with a familiar experience after the objects are opened in specific tools.

Figure 2:
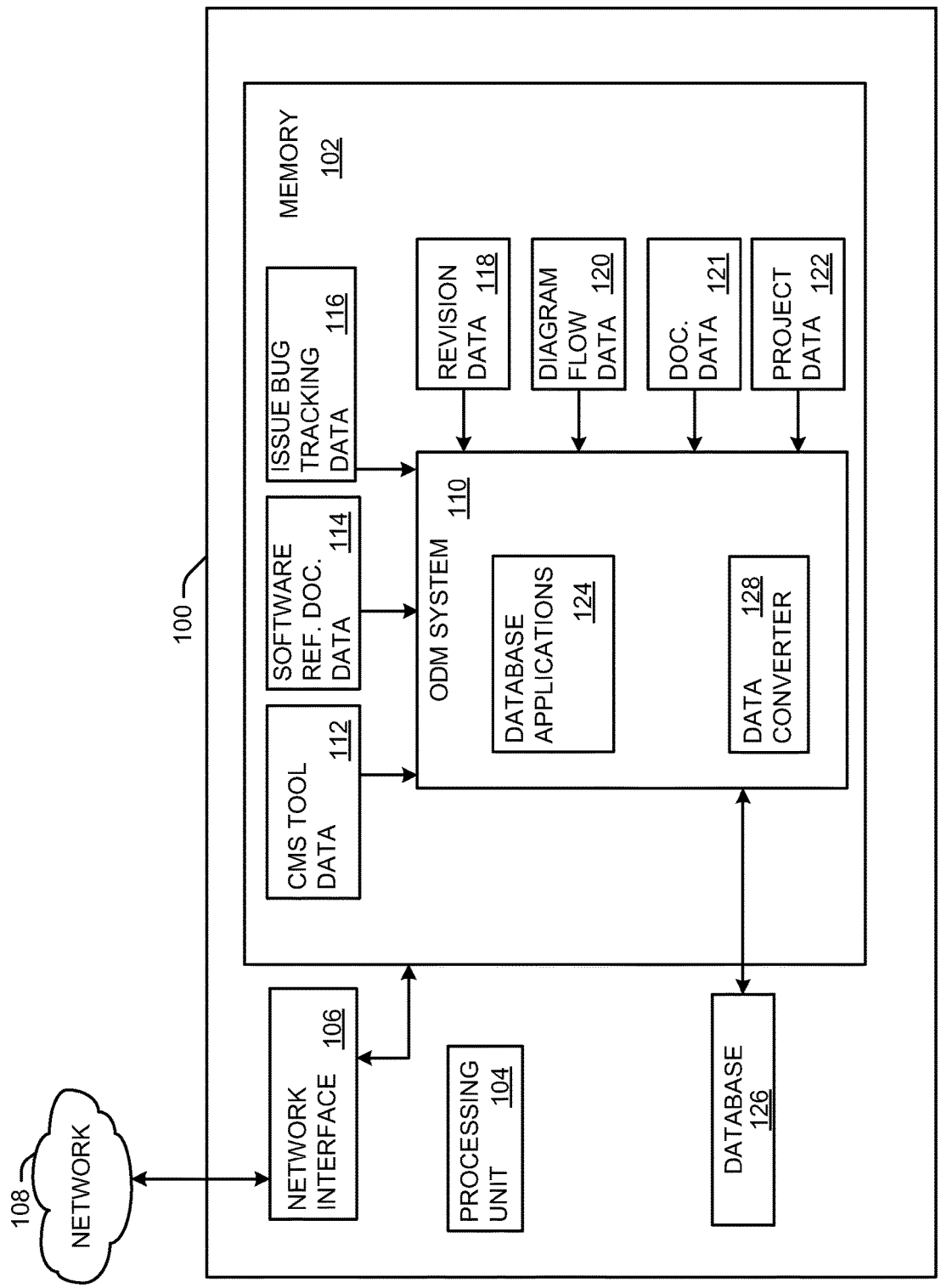
FIG. 2 illustrates an example of a server for implementing and ODM system.

FIG. 2 illustrates an example of a server 100 that could be employed, for example, as the server 54 illustrated in FIG. 1. The server 100 can include a memory 102 that can store machine readable instructions. The memory 102 could be implemented, for example, as non-transitory computer readable media, such as volatile memory (e.g., random access memory), nonvolatile memory (e.g., a hard disk drive, a solid state drive, flash memory, etc.) or a combination thereof. The server 100 can also include a processing unit 104 to access the memory 102 and execute the machine-readable instructions. The processing unit 104 can include, for example, one or more processor cores. The server 100 can include a network interface 106 configured to communicate with a network 108. The network interface 106 could be implemented, for example, as a network interface card. The network 108 could be implemented for example, as a public network (e.g., the Internet), a private network (e.g., a LAN) or a combination thereof (e.g., a VPN).

The server 100 could be implemented, for example in a computing cloud. In such a situation, features of the server 100, such as the processing unit 104, the network interface 106, and the memory 102 could be representative of a single instance of hardware or multiple instances of hardware with applications executing across the multiple of instances (i.e., distributed) of hardware (e.g., computers, routers, memory, processors, or a combination thereof). Alternatively, the server 100 could be implemented on a single dedicated server.

The memory 102 can include an ODM system 110 stored thereon. The ODM system 110 can be employed to associate and aggregate tool data received from a plurality of different tools employed in project management. The tool data can be received at the network interface 106. In some examples, the tool data can be retrieved by the ODM system 110 (e.g., via an API). Additionally or alternatively, some or all of the tool data may be provided (e.g., pushed) to the ODM system from a corresponding tool. In some examples, the tool data can be provided in substantially real-time (e.g., in response to changes). In other examples, the tool data can be provided or retrieved from the different tools periodically.

The tool data can include CMS tool data 112 that characterizes flow charts, CAD diagrams, design specifications, etc. The CMS tool data 112 can be implemented, for example, as a single an expansive document that is associated with a particular project. The CMS tool data 112 can be generated by a CMS tool, such as the CMS tool 58 illustrated in FIG. 1. The tool data can also include software reference documentation data 114 that can characterize documentation for the particular project, including software documentation. The software reference documentation data 114 can be provided from a documentation system, such as the documentation system 76 illustrated in FIG. 1. The tool data can also include (general) document data 121 provided by the documentation system, such as data characterizing a user guide and/or a white paper related to the particular project. The tool data can also include issue-bug-tracking data 116 that characterizes reported bugs in software for the particular project.

The tool data can further include revision data 118 that characterizes a list of revisions made in the particular project. The revision data 118 can be provided from a revision tracking system, such as the revision tracking system 82 of FIG. 1. Yet further, the tool data can include diagram flow data 120 that can characterize multi-domain dynamic system flow models. The diagram flow data 120 can be provided from a diagram generator, such as the diagram generator 78 of FIG. 1. Still yet further, the tool data can yet further include project data 122 that characterizes a list of tasks and associated completion percentages for each task in the particular project, as well as an overall percentage of completion for the project. The project data 122 can be provided from a PMS, such as the PMS 88 of FIG. 1.

Figure 3:
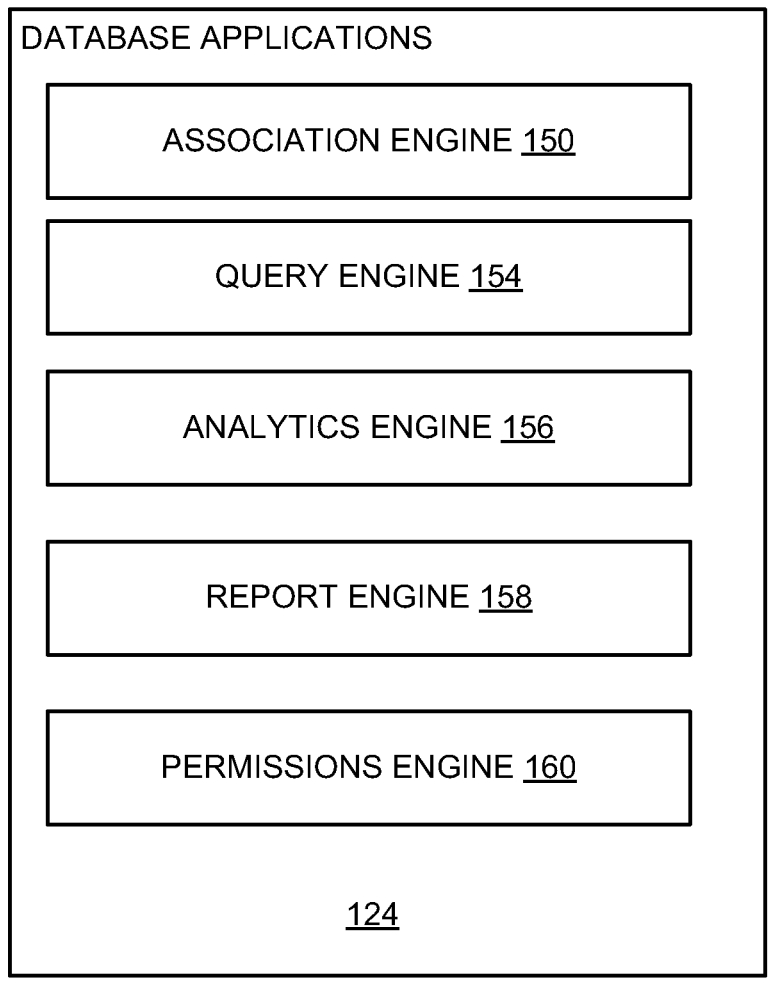
FIG. 3 illustrates an expanded view of database applications illustrated in FIG. 2.

The ODM system 110 can include database applications 124 that can be configured to parse and analyze the tool data in the manner described herein. An expanded view of the database applications 124 are illustrated in FIG. 3. The database applications 124 can include, for example an association engine 150 that can organize and aggregate the tool data into a unified data structure that characterizes a plurality of hierarchically interconnected objects and the unified data structure can be stored in a database 126. The database 126 can be, for example, a relational database, such as a Search and Query Language (SQL) database. The determination of the relationships can be based, for example, on keywords present in the tool data and/or manually (e.g., in response to user input).

The database applications 124 can also include a query engine 154 that can process and execute queries on the database 126. The database application 124 can further include an analytics engine 156 that can modify objects based on values in other objects. The database applications 124 can further include a report engine that can generate an overall report of the database 126 (or some subset thereof). The database applications 124 can still further include a permissions engine 160 that can control access to the database 126.

Figure 4:
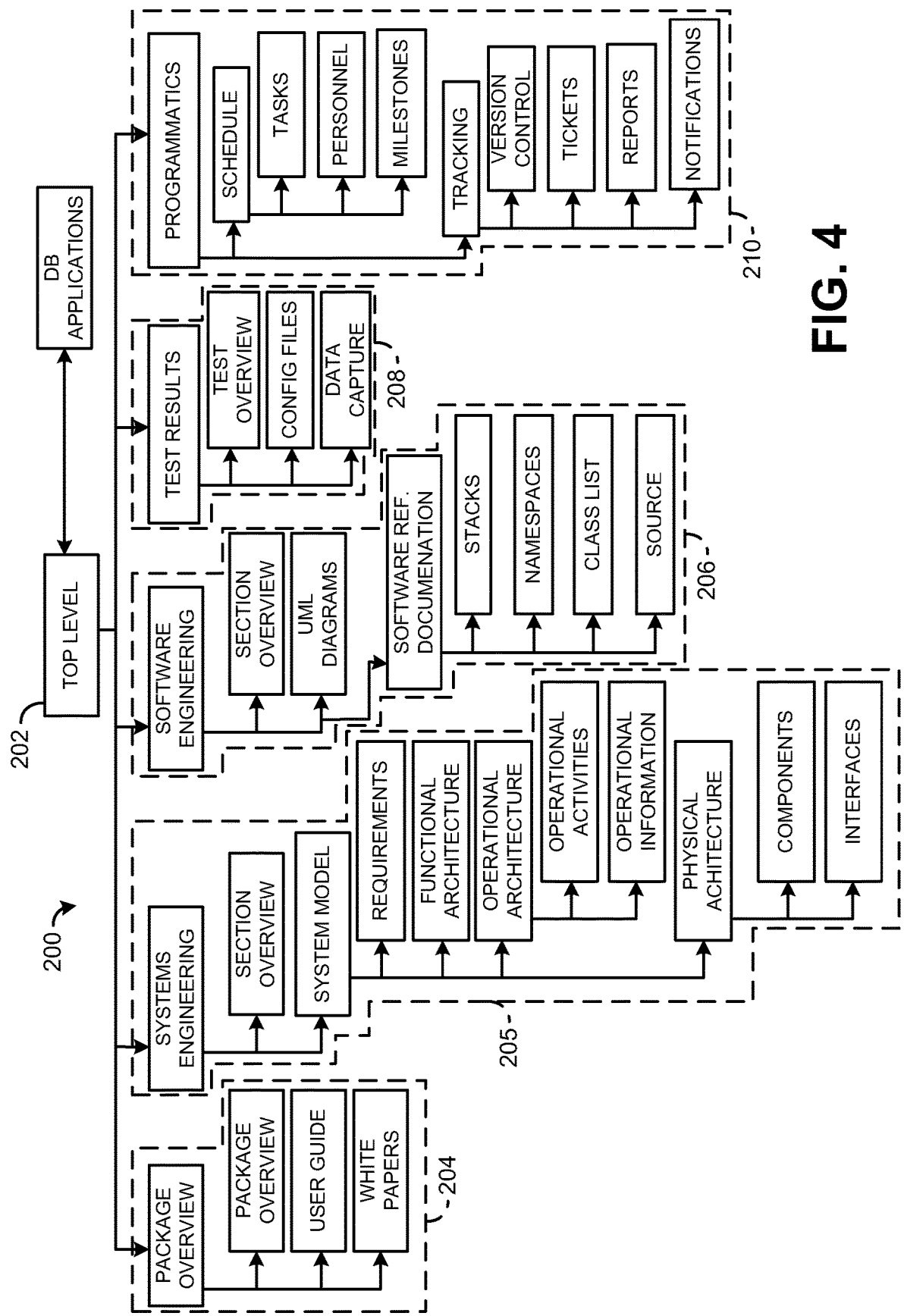
FIG. 4 illustrates an example of a chart generated from tool data.

FIG. 4 illustrates an example of a chart 200 depicting a unified data structure derived from the tool data described in FIG. 2. The unified data structure illustrates hierarchical relationships between objects in the tool data. The relationships could be determined, for example, by the association engine 150 of the database applications 124 illustrated in FIG. 2. The chart 200 includes objects that are associated with different forms of tool data. One such object 202 can be a top level object 202 that identifies an overall project. Moreover, some of the objects in the chart 200 can be derived from document data 204 can include references to objects, such as documentation for a package overview, a user guide and a white papers. Additionally, objects derived from CMS tool data 205 can include objects related to system engineering, a section overview and a system model. The system model of the CMS tool data 205 can include objects such as requirements, functional architecture, operational architecture and physical architecture. Some of these objects such as the operational architecture can include objects related to operational activities and operational information. Other objects such as the physical architecture object can include objects such as components and interfaces.

Objects derived from software documentation reference data 206 can include a section overview and unified modeling language (UML) diagrams. The software reference documentation data 206 can also include an object related to software reference documentation that includes objects related to stacks, namespaces, a class list and source (e.g., source code). Objects derived from diagram flow data 208 can include test results. The test results can include objects related to a test overview, configuration files and a data capture. Objects derived from project data 210 can include programmatics. The programmatics can include a schedule and tracking. The schedule can include objects related to tasks (specific tasks), personnel and milestones. The tracking can include objects related to version control, tickets (trouble tickets), reports and notifications. Each of the objects illustrated in the chart 200 can include references (e.g., based on identified relationships) to other objects that may (or may not) be derived from different forms of tool data. Moreover, such relationships can be direct relationships between objects and may be outside of (and/or in addition to) the hierarchical relationship illustrated in the chart 200.

Figure 5:
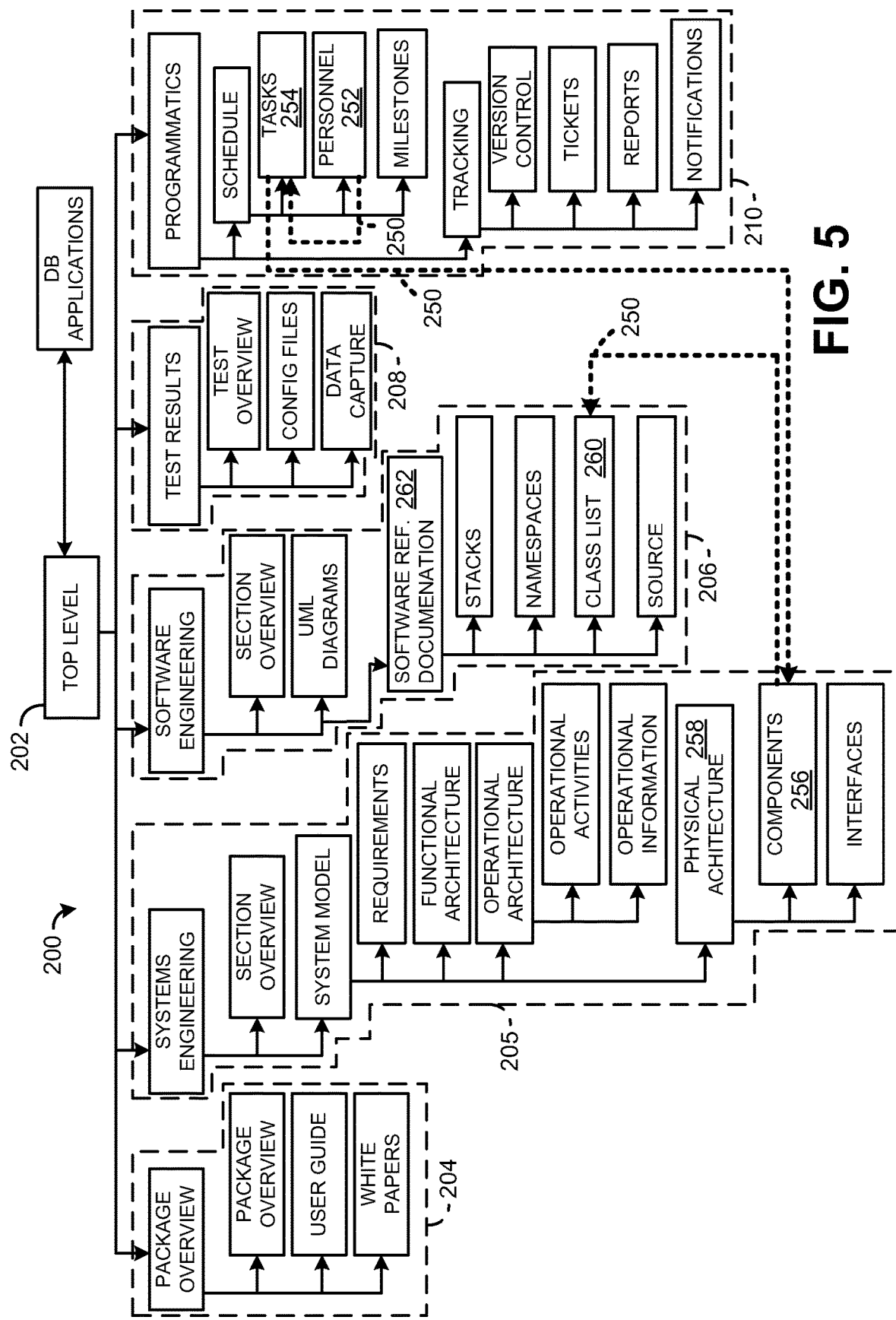
FIG. 5 illustrates an example of the chart illustrated in FIG. 4 being searched in response to a query.

Referring back to FIGS. 2 and 3, to further facilitate understanding of the operations of the ODM system 110, examples of various operations are provided. As noted, the database applications 124 can include applications configured to access the database 126. In a second extended example, (hereinafter, "the second example"), the query engine 154 can process and execute a query (e.g., a custom query) of the database 126. In the second example, it is presumed that the database 126 includes the objects with relations illustrated in the chart 200 of FIG. 4. Moreover, in the second example, the query of the database 126 can include a query for "What are classes is employee John Doe working on"? In response, the query engine 154 can parse the chart 200 in the manner illustrated in FIG. 5. As illustrated in FIG. 5 by the traced arrow 250, the personnel object 252 can be parsed to identify tasks associated with an employee with the name of "John Smith". Upon identification of such tasks, the tasks object 254 can include references to the components object 256 in the physical architecture object 258. In the second example, the components object 256 can include reference to the class list object 260 of the software reference documentation object 262. Therefore, in the second example, the query engine 154 can return classes from the class list object 260 that (i) are identified in the components object 256 (ii) and are associated with a task identified in the tasks object 254 that are assigned (or otherwise associated with) the specific employee ("John Smith") identified in the personnel object 252.

Figure 6:
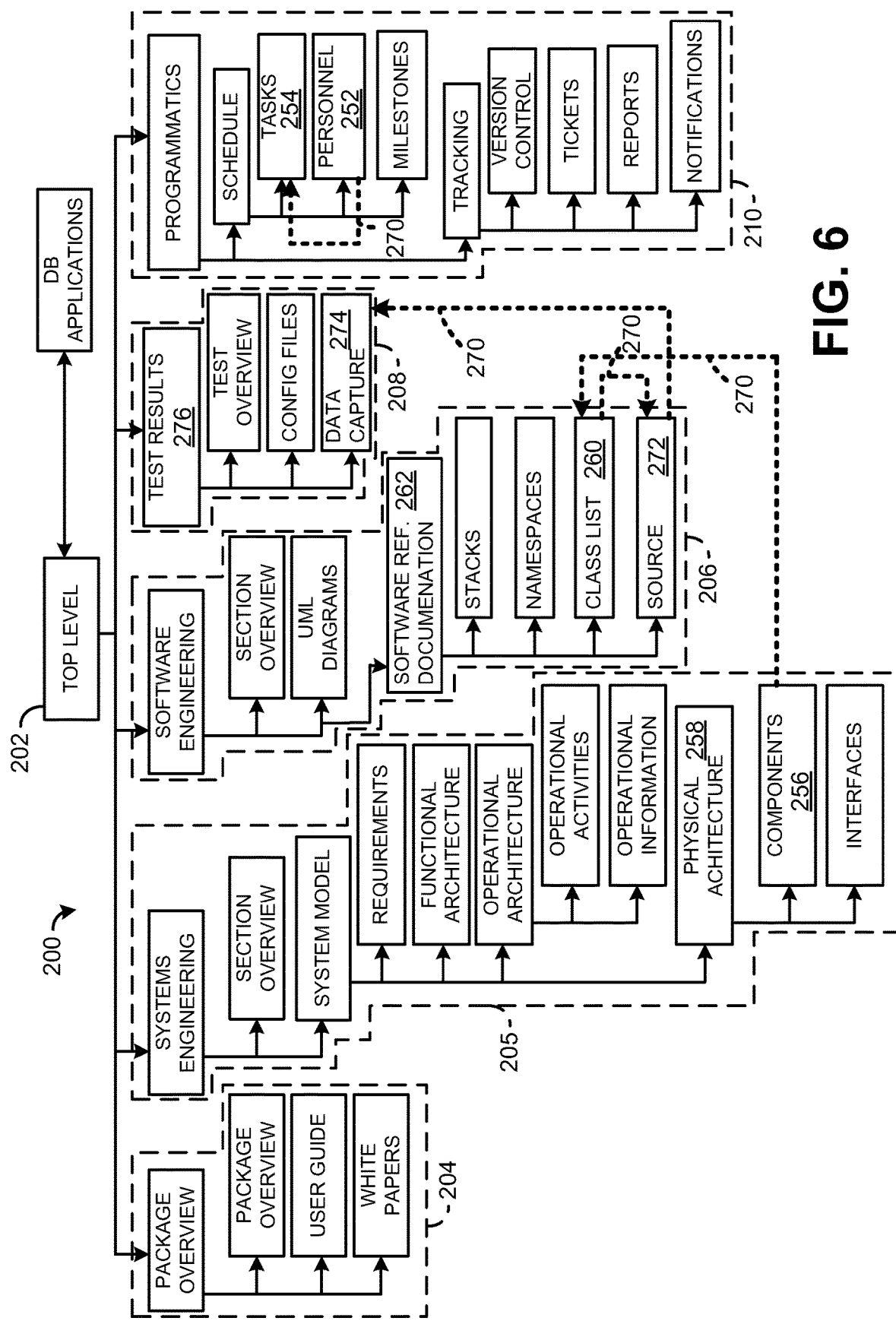
FIG. 6 illustrates another example of the chart illustrated in FIG. 4 being searched in response to a query.

In a third extended example, (hereinafter, "the third example"), the query engine 154 can process and execute another query (e.g., a custom query) of the database 126. In the third example, it is presumed that the database 126 includes the objects with relations illustrated in the chart 200 of FIGS. 4 and 5. Moreover, in the third example, the query of the database 126 can include a query for "What are all the data validating requirements of motor 123"? In response, the query engine 154 can parse the chart 200 in the manner illustrated in FIG. 6. As illustrated in FIG. 6, by the traced arrow 270, the components object 256 can be parsed to identify classes associated with the component "motor 123". Upon identification of such classes, the class list object 260 can be parsed to identify references to a source code object 272. In the third example, the source object 272 can be parsed to identify a reference to a data capture object 274. Additionally, the data capture object 274 of a test results object 276 can be parsed to identify specific instances of test results. Therefore, in the third example, the query engine 154 can return a data capture from the data capture object 274 that (i) is identified in the source object 272 (ii) referenced in a class list object 260 that is referenced by the components object 256 and assigned to (or otherwise associated with) the "motor 123".

Figure 7:
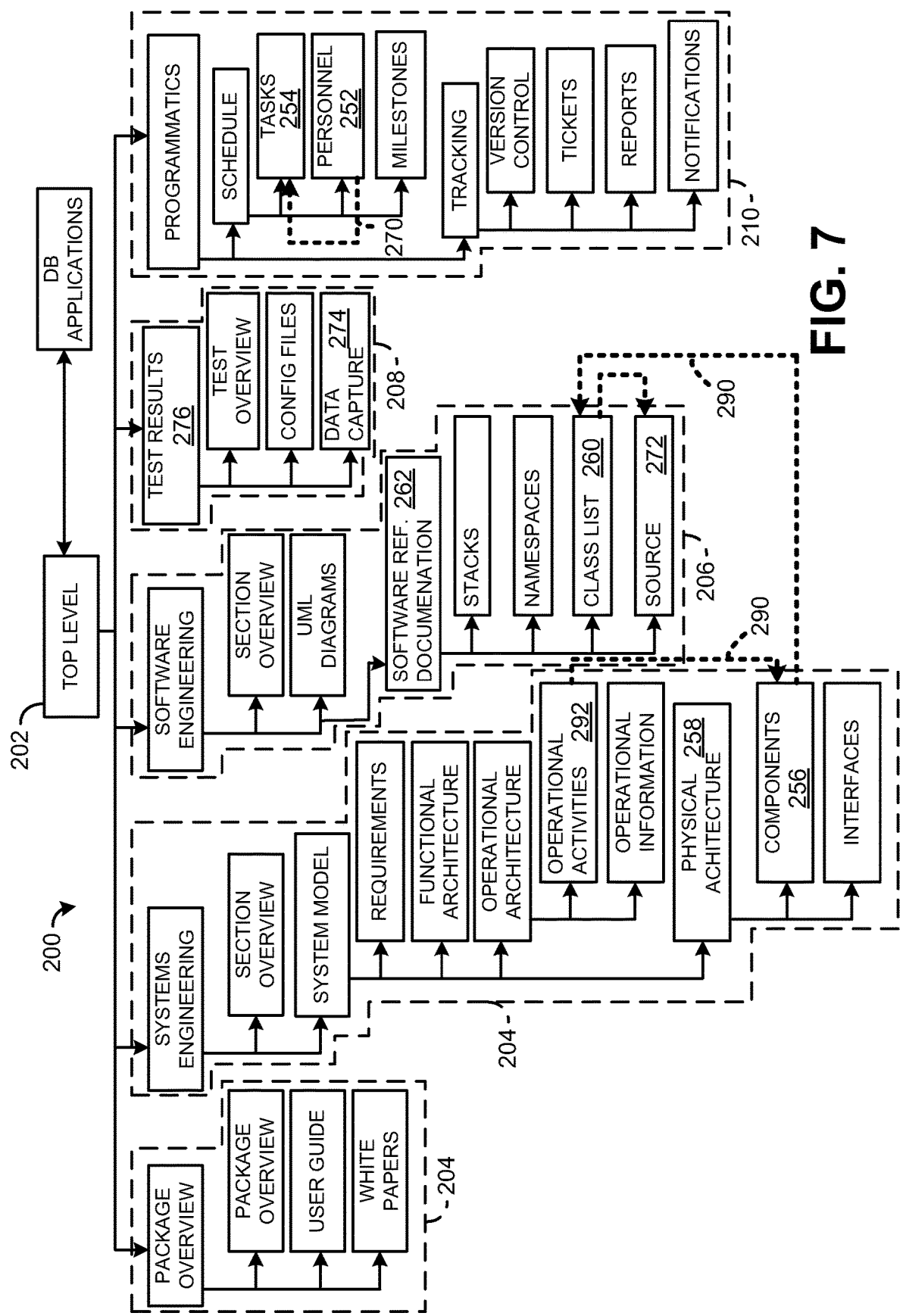
FIG. 7 illustrates an example of the chart illustrated in FIG. 4 being analyzed by an analytics engine.

In a fourth extended example, (hereinafter, "the fourth example") the analytics engine 156 can implement an analytics analysis on objects of the database 126. The analytics can be entered manually (in response to user input) or may be derived automatically. In the fourth example, it is presumed that the database 126 includes the objects with relations illustrated in the chart 200 of FIGS. 4-6. Moreover, in the fourth example, the analytics engine 156 can process a request to determine "What percentage of ConOps has been implemented?" As illustrated in FIG. 7, by the traced arrow 290, the operational activities object 292 can be parsed to identify references the "ConOps" operation. The operational activities object 292 can include a reference to particular components in the components object 256 that are associated with the "ConOps" operation. The components can include a reference to classes in the class list object 260 that are associated with the "ConOps" operation. The analytics engine 156 can analyze features of the classes (e.g., version number, documentation, etc.) that can be derived to determine a percentage of completion of the ConOps operation. Additionally, in some examples, the analytics engine 156 can update (e.g., modify) the project data 210 to reflect the updates to the tasks associated with ConOps. In other examples, the analytics engine 156 can communicate with the PMS and provide data indicating the update to the percentage of completion of the "ConOps" operation. In this situation, the PMS can provide updated project data 122 that can be processed in a manner described herein.

Additionally, the ODM system 110 can include a data converter 128 that can parse the objects of the database 126 to generate web data (e.g., HTML code) that includes links (e.g., hyperlinks) for each of the objects in a project. In particular, the hyperlinks can be an expandable representation of objects in a project (e.g., such as the chart 200 illustrated in FIGS. 4-7). Additionally or alternatively, some of the objects can include a reference to an external system that facilitate opening particular identifies files in an associated tool. For instance, the links can be generated such that upon selecting a link associated with the CMS tool data 112, the CMS system can be configured to open an associated file. The web data can be provided to a web server via the network interface 106, such that end-users can access a web page based on the generated web data.

By employment of the server 100 with the ODM system 110 executing thereon, a traversal of the many parts of a complicated project can be greatly simplified. Such a simplification allows improved resource allocation to particular tasks of a project, as well as improved monitoring of completion of tasks. Additionally, little to no modification to the software tools that provide portions of the tool data is needed. Thus, the conventional workflow of each software tool remains substantially unchanged, thereby providing end-users with a familiar experience.

Figure 8:
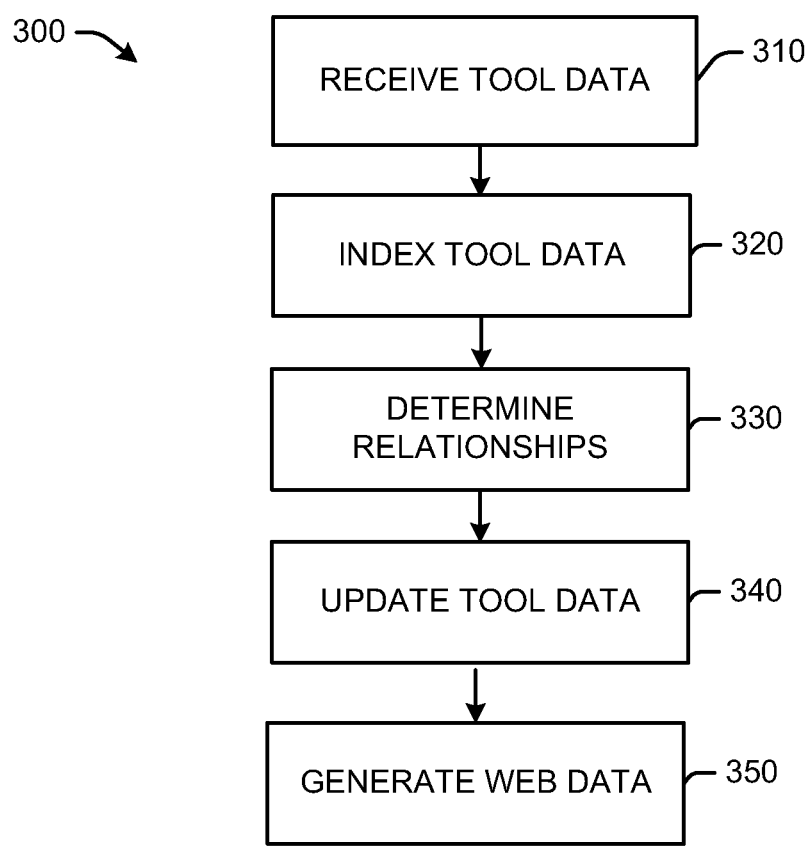
FIG. 8 illustrates a flowchart of an example method for integrating and processing tool data.

In view of the foregoing structural and functional features described above, an example method will be better appreciated with reference to FIG. 8. While, for purposes of simplicity of explanation, the example method of FIG. 8 is shown and described as executing serially, it is to be understood and appreciated that the present examples are not limited by the illustrated order, as some actions could in other examples occur in different orders, multiple times and/or concurrently from that shown and described herein. Moreover, it is not necessary that all described actions be performed to implement a method. The example method of FIG. 8 can be implemented as instructions stored in a non-transitory machine-readable medium. The instructions can be accessed by a processing resource (e.g., one or more processor cores) and executed to perform the methods disclosed herein.

FIG. 8 illustrates a flowchart of an example method 300 for integrating and processing tool data. The method 300 can be implemented by an ODM system executing on a server, such as the ODM system 52 illustrated in FIG. 1 and/or the ODM system 110 illustrated in FIG. 2. At 310, tool data can be received from a plurality of disparate tools employed to implement a project. Portions of the tool data can be provided, for example, from a CMS tool (e.g., the CMS tool 58 illustrated in FIG. 1), a documentation system (e.g., the documentation system 76 illustrated in FIG. 1), an issue tracking system (e.g., the issue tracking system 80 illustrated in FIG. 1), a revision tracking system (e.g., the revision tracking system 82 illustrated in FIG. 1), a diagram generator (e.g., the diagram generator 78 illustrated in FIG. 1), a PMS (e.g., the PMS 88 illustrated in FIG. 1) or some subset thereof, etc.

At 320, the tool data can be indexed by the ODM system. Indexing of the tool data can include, but is not limited to parsing the tool data to form a data structure with hierarchical relationships between objects. At 330, relationships between objects in the data structure can be determined by the ODM system. The relationships can be determined, for example based on keywords, analytics, manual assignments, etc. At 340, the ODM system can update the tool data. The updating of the tool data can include, for example, updating project data provided by the PMS based on an analytical analysis of other portions of the tool data. At 350, the ODM system can generate web data based on the data structure. The web data can include, for example, hyperlinks that can cause individual tools to open specific files.

In view of the foregoing structural and functional description, those skilled in the art will appreciate that portions of the systems and method disclosed herein may be embodied as a method, data processing system, or computer program product such as a non-transitory computer readable medium. Accordingly, these portions of the approach disclosed herein may take the form of an entirely hardware embodiment, an entirely software embodiment (e.g., in a non-transitory machine readable medium), or an embodiment combining software and hardware. Furthermore, portions of the systems and method disclosed herein may be a computer program product on a computer-usable storage medium having computer readable program code on the medium. Any suitable computer-readable medium may be utilized including, but not limited to, static and dynamic storage devices, hard disks, solid-state storage devices, optical storage devices, and magnetic storage devices.

Certain embodiments have also been described herein with reference to block illustrations of methods, systems, and computer program products. It will be understood that blocks of the illustrations, and combinations of blocks in the illustrations, can be implemented by computer-executable instructions. These computer-executable instructions may be provided to one or more processors of a general purpose computer, special purpose computer, or other programmable data processing apparatus (or a combination of devices and circuits) to produce a machine, such that the instructions, which execute via the one or more processors, implement the functions specified in the block or blocks.

These computer-executable instructions may also be stored in computer-readable memory that can direct a computer or other programmable data processing apparatus to function in a particular manner, such that the instructions stored in the computer-readable memory result in an article of manufacture including instructions which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

What have been described above are examples. It is, of course, not possible to describe every conceivable combination of structures, components, or methods, but one of ordinary skill in the art will recognize that many further combinations and permutations are possible. Accordingly, the invention is intended to embrace all such alterations, modifications, and variations that fall within the scope of this application, including the appended claims. Where the disclosure or claims recite "a," "an," "a first," or "another" element, or the equivalent thereof, it should be interpreted to include one or more than one such element, neither requiring nor excluding two or more such elements. As used herein, the term "includes" means includes but not limited to, and the term "including" means including but not limited to. The term "based on" means based at least in part on.

What is claimed is:

1. A non-transitory machine readable medium having machine executable instructions comprising an online data management (ODM) system being configured to:
   parse tool data for a particular project provided from a plurality of disparate software tools employed for project management, wherein each tool is a modular software system component and has a unique functionality;
   generate a data structure based on the tool data, wherein the data structure comprises a hierarchy of interconnected objects, the objects corresponding to a plurality of different modular software system components that cooperate to implement a project, wherein the data structure is stored in a relational database; and
   identify relationships between objects of the data structure;
   parse using a query engine of the ODM system the data structure for relationships between objects based on a query request;
   generate web data that characterizes the data structure, wherein the web data comprises a plurality of links to access the plurality of disparate software tools; and
   causing execution of a file associated with one of the plurality of disparate software tools upon selection of a given link.

2. The medium of claim 1, wherein each of the disparate software tools outputs data in a different format.

3. The medium of claim 1, wherein the tool data comprises complex modeling system (CMS) tool data characterizing system models of software and hardware employed in the particular project.

4. The medium of claim 1, wherein the tool data comprises documentation data that characterizes in-line documentation of source code for the particular project.

5. The medium of claim 1, wherein the tool data comprises diagram-flow data that characterizes a data flow structure of tasks in the particular project.

6. The medium of claim 1, wherein the tool data comprises issue-bug-tracking data that characterizes reports of software bugs in the particular project.

7. The medium of claim 1, wherein the tool data comprises project data that characterizes a list of tasks for the particular project and percentage of completion of each of the tasks.

8. The medium of claim 1, wherein the tool data comprises:
   complex modeling system (CMS) tool data characterizing system models of software and hardware employed in the particular project;
   documentation data that characterizes in-line documentation of source code for the particular project;
   diagram-flow data that characterizes a data flow structure of tasks in the particular project;
   issue-bug-tracking data that characterizes reports of software bugs in the particular project; and
   project data that characterizes a list of tasks for the particular project and percentage of completion of each of the tasks.

9. The medium of claim 1, wherein the ODM system comprises an analytics engine to update a given object of the data structure based on an analytical analysis of a plurality of other objects in the data structure.

10. The medium of claim 9, wherein the analytical analysis comprises a determination of a percentage that a task of the particular project is completed.

11. The medium of claim 1, wherein the ODM system further comprises a converter configured to generate the web data based on the data structure.

12. The medium of claim 11, wherein each of the plurality of links are associated with a set of the interconnected objects of the data structure.

13. One or more computing devices that execute an online data management (ODM) system, the ODM system comprising:
   an association engine configured to:
      parse tool data received from a plurality of different software tools that are employed to implement a particular project, wherein each of the different software tools generates data in a different format, and wherein each tool is a modular software system component and has a unique functionality; and index the tool data to form a data structure with interconnected objects arranged in a hierarchical graph, the objects corresponding to a plurality of different modular software system components that cooperate to implement a project, wherein the association engine is configured to determine relationships between objects of the data structure based on at least one of keywords and user input;

a converter configured to generate web data that characterizes the data structure, wherein the web data includes a plurality of links to access the plurality of different software tools and wherein upon selection of a given link of the plurality of link causes execution of a file associated with one of the plurality of different software tools; and a search engine configured to search the data structure for relationships between objects based on an input query.

14. A method comprising:

receiving tool data from a plurality of different software tools employed in a project, wherein each tool is a modular software system component and has a unique functionality;

indexing the tool data to form a data structure having a plurality of objects hierarchically interconnected, the objects corresponding to a plurality of different modular software system components that cooperate to implement a project;

determining relationships between the objects of the data structure based on at least one of keywords and user input;

generating web data that characterizes the data structure, wherein the web data comprises a plurality of links to access the plurality of different software tools; and causing execution of a file associated with one of the plurality of different software tools upon selection of a given link.

15. The method of claim 14, wherein the given link of the plurality of links is associated with a given object of the plurality of objects.

16. The method of claim 14, further comprising updating the tool data based on an analytical analysis of a set of the plurality of objects of the tool data.

* * * * *